United States Patent [19]

Bosshard

[11] Patent Number: 4,630,738
[45] Date of Patent: Dec. 23, 1986

[54] RACK FOR STORING NUCLEAR FUEL ELEMENTS

[75] Inventor: Ernst Bosshard, Winterthur, Switzerland

[73] Assignee: Sulzer Brothers Limited, Winterthur, Switzerland

[21] Appl. No.: 552,746

[22] Filed: Nov. 17, 1983

[30] Foreign Application Priority Data

Nov. 17, 1982 [CH] Switzerland ............... 6692/82

[51] Int. Cl.$^4$ ............................................. A47F 7/00
[52] U.S. Cl. ................................. 211/60.1; 211/133; 312/111; 403/219
[58] Field of Search ............... 211/60.1, 70.4, 194, 211/71, 182, 183, 126, 133; 403/217, 219, 170, 174, 178; 312/111; 248/188.7; 220/23.4, 23.6; 206/504

[56] References Cited

U.S. PATENT DOCUMENTS

| | | | |
|---|---|---|---|
| 692,052 | 1/1902 | Forster | 312/111 |
| 3,370,871 | 2/1968 | Piarotto | 403/219 X |
| 3,877,669 | 4/1975 | Ambasz | 248/188.7 |
| 3,913,754 | 10/1975 | Swartz | 211/70.4 |

*Primary Examiner*—Ramon S. Britts
*Assistant Examiner*—Sarah A. Lechok Eley
*Attorney, Agent, or Firm*—Kenyon & Kenyon

[57] ABSTRACT

The rack for storing nuclear fuel elements is provided with a plurality of joints for laterally supporting the upstanding tubes. Each joint is formed by a bar welded to the corner of a square tube in which a fuel element is to be contained. Each bar is, in turn, laterally contacted and secured to the adjacent bar by a tightening means. In one embodiment, the connecting bars are disposed in side-by-side relation with the tightening means including a horizontally disposed nut and bolt unit. In another embodiment, the bars are in the form of square bars which are shaped to accommodate a vertical bolt and nut assembly. In this embodiment, annular members having conical surfaces are received in mating grooves at the ends of the bars so as to draw the bars together during tightening of the nut and bolt unit. In a third embodiment, four square bars are drawn together via two U-shaped members horizontally disposed bolts.

11 Claims, 4 Drawing Figures

RACK FOR STORING NUCLEAR FUEL ELEMENTS

This invention relates to a rack for storing nuclear fuel elements.

Heretofore, various racks have been known for storing nuclear fuel elements. For example, it has been known to construct a rack of a baseplate and a bunch of parallel and substantially vertical neutron-absorbent square tubes which are secured to the baseplate. In addition, lugs in the form of hinges or pivots have been welded to the edges of the square tubes in order to provide lateral support between the tubes. Usually, the lugs of two to four square tubes extend coaxially and abut one another vertically when the rack is assembled. The lugs are then connected by a pin which is inserted through the lugs. However, while this type of joint has been a simple and reliable solution, the joint has the disadvantage that it can be used only if the square tubes can be shifted horizontally during assembly.

Accordingly, it is an object of the invention to provide a rack in which individual square tubes can be fitted vertically into final position on a baseplate and individually removed vertically.

It is another object of the invention to provide a rack for storing nuclear fuel elements which can be readily assembly and disassembled.

It is another object of the invention to provide a rack for storing nuclear fuel elements in which a fuel element containing tube can be readily removed should jamming of a fuel element occur within the tube.

Briefly, the invention provides a rack for storing nuclear fuel elements which is comprised of a baseplate, a plurality of parallel neutron-absorbent square tubes secured to the baseplate in upright manner and a plurality of connectors which are secured to the tubes for laterally supporting the tubes. In accordance with the invention, each connector is secured to a respective corner of a respective tube and disposed in lateral contact with a connector of at least one adjacent tube at least in a central plane between adjacent tubes. In addition, tightening means are provided for drawing the contacting connectors laterally against one another.

The lateral joint which is formed by the connectors and tightening means has an advantage in that the joint is completely free of any play.

By disposing the joints at a plurality of heights along the tubes, a very rigid connection is obtained which is adequate even in the event of an earthquake.

In one embodiment, the tightening means for each joint or connection includes a horizontal disposed bolt. This permits very simple structural elements to be used for the connectors and the tightening means.

In another embodiment, each tightening means includes a pair of vertically spaced annular members each of which has a conical surface received in a mating recess at a respective end of each contacting connector. In addition, a vertically disposed bolt passes through the annular members and the connectors with a head engaging one of the annular members while a nut is threaded on the bolt against the other annular member. This embodiment has the advantage that during assembly of the tightening means, four adjacent square tubes can be centered on a common vertical axis without any alignment operations while obtaining a vertically rigid connection. Further, each connector may be made in the form of a square bar having a hollowed corner to accommodate the bolt of the tightening means and with a mating recess in the form of a 90° frustoconical sector to receive an annular member at each end. This provides a very rigid connection and prevents any of the connectors from pivoting about the common axis.

The mating recess in the end of each connector is formed at the end face in order to reduce material outlay, particularly if the connectors are made by pressing.

In still another embodiment, the tightening means includes at least one channel-shaped member having a pair of tapered surfaces received in mating grooves of two adjacent connectors. In addition, a bolt passes through the member and the contacting connectors and has means for securing the bolt in place.

These and other objects and advantages of the invention will become more apparent from the following detailed description taken in conjunction with the accompanying drawings wherein FIG. 1 illustrates a horizontal sectional view through the corners of four adjacent square tubes secured by a joint in accordance with the invention;

Figure 1:
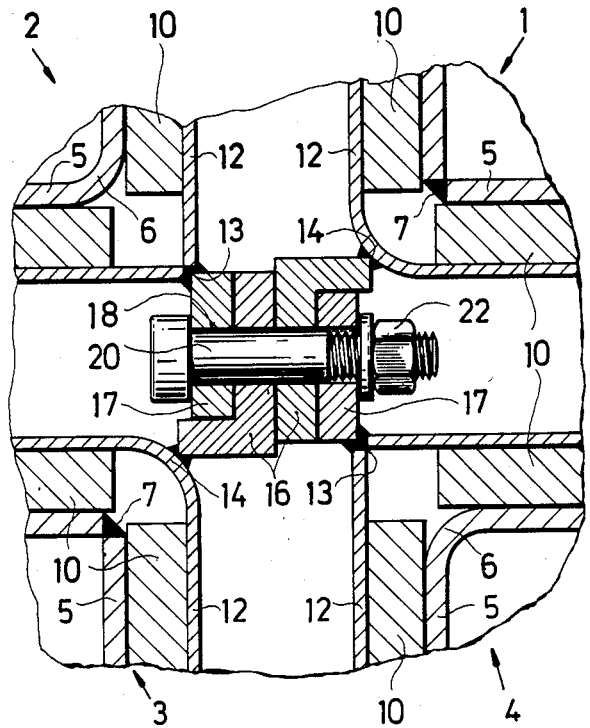

Referring to FIG. 1, the rack includes a base plate (not shown) and a plurality of parallel neutron-absorbent square tubes 1–4 secured to the base plate in upright manner. Each of the square tubes 1–4 which are disposed in substantially vertical manner contains an inner tube 5 which is formed of two angle plates which are welded together. As indicated, two of the four edges of the inner tube 5 are in the form of a bend 6 while the two other edges are in the form of a weld 7. In addition, neutron-absorbent plates 10, for example, consisting of a sintered boron aluminum sheet, are fitted on the four sides of each of the square tubes 1–4. In addition, a square surrounding tube 12 encloses the unit defined by the inner tube 5 and plates 10.

As shown, each tube 12 is also welded together from two angle plates, the weld being made along two edges so that the edges alternate at the periphery in the form of a welded edge 13, a bend 14, a welded edge 13 and a bend 14.

The rack is also provided with a plurality of joints for laterally securing the adjacent tubes 1–4 to each other. As shown in FIG. 1, each joint includes a plurality of connectors 16, 17 which are secured to a respective corner of a respective tube 1–4. As indicated, two of the connectors 16 are in the form of an L-shaped bar while the other connectors 17 are in the form of flat section bars . Each L-shaped bar 16 is welded by the shorter limb to a bend 14 while each flat section bar 17 is welded to a weld 13 of a respective square tube 1–4. The bars 16, 17 are about 20 centimeters long in the vertical direction and are disposed at the same height at the four square tubes 1–4. These bars 16, 17 are horizontally drilled at three places to have bores 18 and are disposed in lateral contact with each other in a central plane between the adjacent tubes.

Each joint also has a tightening means for drawing the contacting connectors 16, 17 laterally against one another. In this regard, the tightening means includes three screw bolts 20 which pass through the bores 18 of the bars 16, 17 as well as associated nuts 22 which are threaded onto the bolts 20.

The bars 16, 17 are made to close tolerances and are welded by means of accurate jigs to the welded edges 13 and the bends 14 of the tubes 1-4 with such accuracy that the square tubes 1-4 can be lowered from above onto the base plate (not shown) without the bars 16, 17 catching in one another. To this end, the facing end portions of the bars 16, 17 are slightly bevelled. After the square tubes 1-4 have been introduced, conically ground locating pins are inserted through two of the bores 18 of each joint and then the bolt 20 and associated nut 22 are introduced in the third hole by suitable manipulating tools from the side and are screwed together. The locating pins are then successively removed and each replaced by a bolt 20 and nut 22.

This is a very simple, reliable and inexpensive construction. The bars 16, 17 can be made in relatively long lengths, for example, by means of a drawing operations and then cut. Further the bores 18 may be drilled with the bars 16, 17 in jigs.

Figure 2:
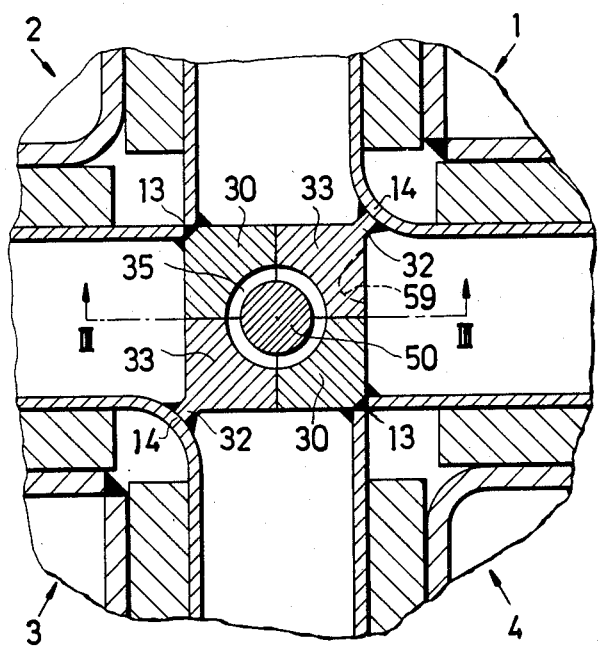
FIG. 2 illustrates a view taken on line II—II of FIG. 3 of a modified joint in accordance with the invention.
Figure 3:
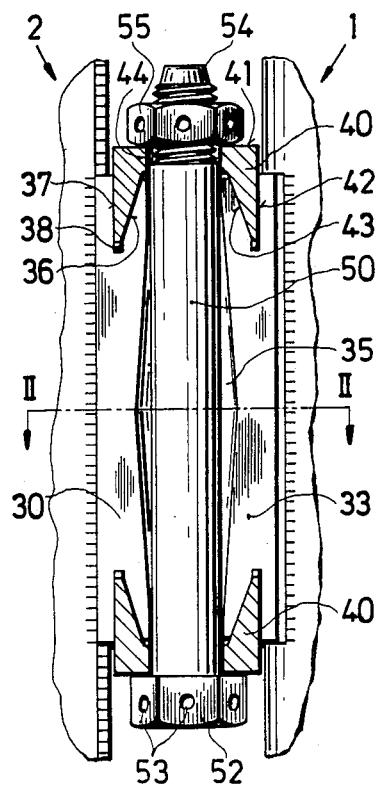
FIG. 3 illustrates a view taken on line III—III of FIG. 2.

Referring to FIGS. 2 and 3, wherein like reference characters indicate like parts as above, each joint for laterally securing the square tubes 1-4 together may be constructed in an alternative manner. For example, the joint may be formed of two pairs of connectors 30, 33 which are made from square bars. In this regard, two square bars 30 are provided with broken corners which are welded to the welded edges 13 while the other two bars 33 are provided with shallow longitudinal ribs 32 which are welded to the bends 14. In addition, each of the square bars 30, 33 has a hollowed corner so that the four bars 30, 33 form, as a combined structure, a central aperture 35. As indicated in FIG. 3, this aperture is in the form of a double conical interior. In addition, each bar 30, 33 has a recess in each end which is in the form of a 90° frusto-conical sector. Further, each recess includes an inner conical surface 36, an outer cylindrical surface 37 and a groove 38 at the lowest point.

The tightening means for securing the bars 30, 33 together includes a pair of vertically spaced annular members 40 which are disposed at the respective ends of the bars 30, 33. Each annular member 40 is received in mating relation in the recesses at the ends of the bars 30, 33. As shown in FIG. 3, each annular member 40 has a plane surface 41, an outer cylindrical surface 42, an inner conical surface 43 and a central bore 44. The inner conical surface 43 is disposed to engage the inner conical surface 36 of each recess in the bars 30, 33.

In addition, the tightening means includes a vertically disposed extension bolt 50 which passes through the bores 44 of the annular members 40 and the aperture 35 defined by the bars 30, 33. The bolt 50 includes a head 52 which engages the lowermost annular member 40 and a threaded stem 54 on which a nut 55 is threaded against the uppermost annular member 40. As indicated, the annular members 40 are clamped vertically by the bolt 50. Both the head 52 of the bolt 50 and the nut 55 have impressions 53 in their respective flats. The impressions 53 of the head 52 are provided to receive resiliently mounted balls of a hexagonal nut (not shown) which is fixed, extending upwardly, at the bottom end of a first rod-like assembly member (not shown). A second rod-like assembly member (not shown) for the nut 55 has a hexagonal nut disposed at bottom end of this member by way of a universal joint which hexagonal nut has at least one radially resiliently mounted ball resilient bore.

The square tubes 1-4 may be of a height of, for example, four meters. In this case, the bars 30, 33 are disposed at about 1, 2, 3 and 4 meters above the bottom edge of the square tubes 1-4. In order to assemble these square tubes 1-4, they are screwed, as described in Swiss Patent No. 631,673 to the baseplate (not shown) via inwardly directed flanges. Thereafter, an upwardly extending bolt 50 with an annular member 40 resting on the head 52 is introduced from the bottom into the space 35 by means of the first assembly rod (not shown) An annular member 40 is then fitted from above and then the nut 55 is screwed down onto the stem 54 of the bolt 50 by means of the second assembly rod (not shown) which, due to the universal joint, can be introduced from an angle, if necessary, and tightened. This operation causes the annular members 40 to be pressed against one another so that the four square bars 30, 33 are pulled against one another.

The nuts on the bolt head 52 and on the nut 55 can now be readily removed and withdrawn by means of the assembly rods. Since the screw thread 54 of the bolt 50 is very square-threaded, there is generally no need for additional locking means for the nut 55 and the bolt 50.

As noted above, the square bars 30, 33 are recessed in double conical form along their common edges. This reduces both the amount of material required as well as warping during the welding of the square bars 30, 33.

The square bars 30, 33 are advantageously produced by pressing. Further, each bar may have lateral longitudinal grooves in order to further reduce their weight, as shown, for example, by the broken line 59 in FIG. 2.

Since the bars 30, 33 are each disposed in an edge zone of the square tubes 1-4 where there are no plates 10, there is no risk that these plates 10 may become excessively heated during the welding operation.

Of course, the bars 30, 33 can be pressed against one another by way of tapering the surfaces instead of conical surfaces. In this case, the bars 30, 33 can be disposed in any direction.

Figure 4:
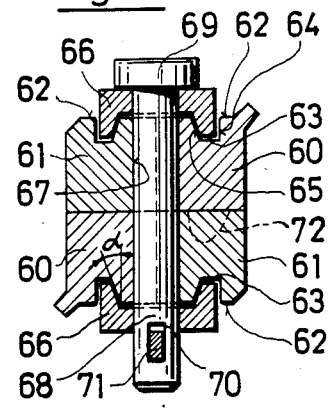
FIG. 4 illustrates a third embodiment of a joint in accordance with the invention.

Referring to FIG. 4, in an alternative construction, the joint may be formed of four substantially square section members or bars 60, 61. As indicated, each bar 60, 61 has a longitudinal groove 63 in one of the sides 62 with one flank 64 of each groove being perpendicular while the other flank 65 is tapered at a slight angle to the side 62. In addition, the tightening means includes a pair of channel-shaped (or U-shaped) members 66 each of which has a pair of limbs with tapered surfaces received in the grooves 63 of two adjacent bars 60, 61 in mating relation. As indicated, each limb has an interior side with a slight taper of an angle $\alpha$ which coincides with the angle of the flank 65 of the mating groove 63.

The tightening means also includes a horizontally disposed bolt 68 which passes through the channel shaped member 66 and bars 60, 61 with a head 69 engaging one member 66 while a means is provided at the opposite end to secure the bolt 68 in place. For example, this latter means may be in the form of a flat key 71 which is inserted through a slot 70 in the bolt 68 against the member 66.

The square bars 60, 61 are formed so as to define transverse bores 67, disposed one above the other to accommodate respective bolts 68. The square bars 60, 61 extend, as in FIG. 2, in parallel relationship to the edges of the square tubes (not shown). In addition, the square bars 60, 61 may also be provided with weight-reducing grooves which may, for example, be profiled as indicated by the broken line 72.

The joint illustrated in FIG. 4 has the advantage of being capable of production mainly by drawing.

The invention thus provides a rack which can be constructed in a manner so that the upstanding neutron absorbent tubes are laterally supported by joints which can be readily fabricated and assembled. Further, in the event that a fuel element jams in a square tube of the rack, the adjacent square tubes can be easily removed in an upward direction. Thereafter, the square tube containing the jamming fuel assembly can be cut off at the base by means of a cutting tool. The fuel element in question can then be removed in the upward direction together with the square tube fragment. Next, the flange remaining on the baseplate can be removed with the rest of the square tube. A new square tube can then be installed without difficulty.

Various modifications can then be made in the joints for the rack. For example, the bolt 50 of the embodiment of FIGS. 2 and 3 may be replaced by a yoke in the form of a screw clamp which is disposed next to the bars together with screw. In this case, one arm of the yoke and the set screw each act on the annular members 40.

What is claimed is:

1. A rack for storing nuclear fuel elements comprising
   a baseplate;
   a plurality of parallel neutron-absorbent square tubes secured to said baseplate in upright manner;
   a plurality of connectors secured to said tubes for laterally supporting said tubes, each said connector being secured to a respective corner of a respective tube and disposed in lateral contact with a connector of at least one adjacent tube at least in a central plane between adjacent tubes; and
   tightening means for drawing said contacting connectors laterally against one another.

2. A rack as set forth in claim 1 wherein said plurality of connectors are disposed at a plurality of heights of said tubes.

3. A rack as set forth in claim 1 wherein each tightening means includes a horizontally disposed bolt.

4. A rack as set forth in claim 1 wherein each tightening means includes a pair of vertically spaced annular members, each said member having a conical surface received in a mating recess at a respective end of each contacting connector, a vertically disposed bolt passing through said pair of annular members and said contacting connectors and having a head engaging one of said pair of annular members, and a nut threaded on said bolt against the other of said pair of annular members.

5. A rack as set forth in claim 4 wherein each connector is in the form of a square bar having a hollowed corner to accommodate a respective bolt, each said bar having a mating recess in the form of a 90° frusto-conical sector.

6. A rack as set forth in claim 1 wherein each tightening means includes a pair of channel-shaped members, each said member having a tapered surface received in a mating groove along a respective side of a respective contacting connector, a horizontally disposed bolt passing through said pair of members and said contacting connectors and having a head engaging one of said pair of members, and a key disposed in said bolt and abutting the other of said pair of members.

7. A rack for storing nuclear fuel elements comprising
   a plurality of parallel neutron-absorbing rectangular tubes; and
   a plurality of joints for laterally securing adjacent tubes to each other, at least one joint including a plurality of connectors, each said connector being secured to a respective corner of a respective tube and disposed in lateral contact with a connector of at least one adjacent tube and tightening means for drawing said contacting connectors laterally against one another.

8. A rack as set forth in claim 7 wherein said connectors of said one joint are aligned in a common horizontal plane and said tightening means includes a bolt passing through said connectors.

9. A rack as set forth in claim 7 wherein said tightening means includes at least one annular member having a conical surface received in a mating recess at a respective end of each connector of said one joint, a vertically disposed bolt passing through said member and said contacting connectors, and a nut threaded on said bolt against said member.

10. A rack as set forth in claim 9 wherein said connectors of said one joint include four square bars, each bar having a hollowed corner to accommodate said vertical bolt.

11. A rack as set forth in claim 7 wherein said tightening means includes at least one channel-shaped member having a pair of tapered surfaces received in mating grooves of two adjacent connectors, a bolt passing through said member and said contacting connectors, and means for securing said bolt in place.

* * * * *